Dec. 15, 1942.　　D. C. ASHMORE ET AL　　2,305,055
MACHINE GENERATING CURVED SURFACES
Filed Aug. 17, 1940　　6 Sheets-Sheet 1
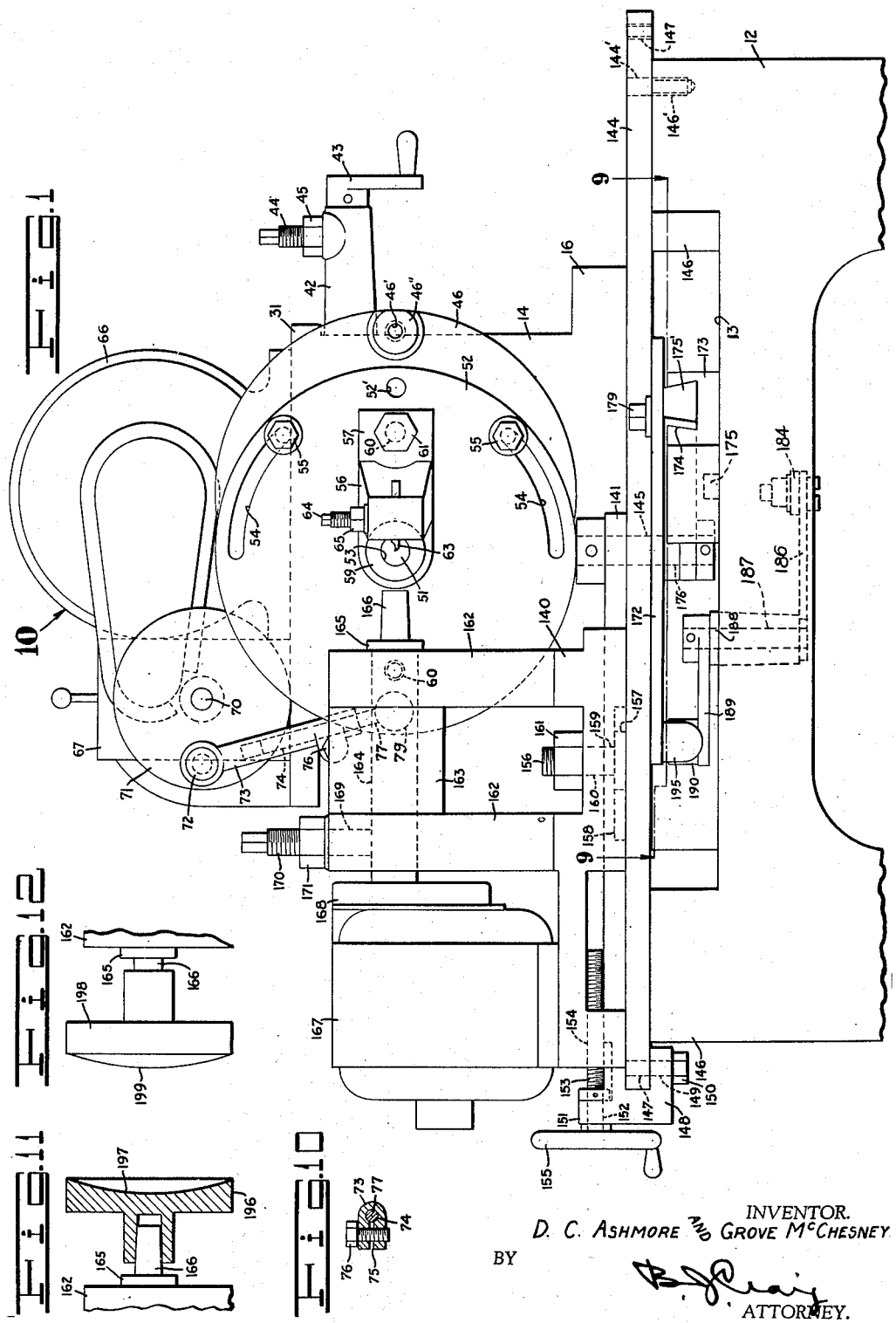
INVENTOR.
D. C. ASHMORE AND GROVE McCHESNEY
BY
ATTORNEY.

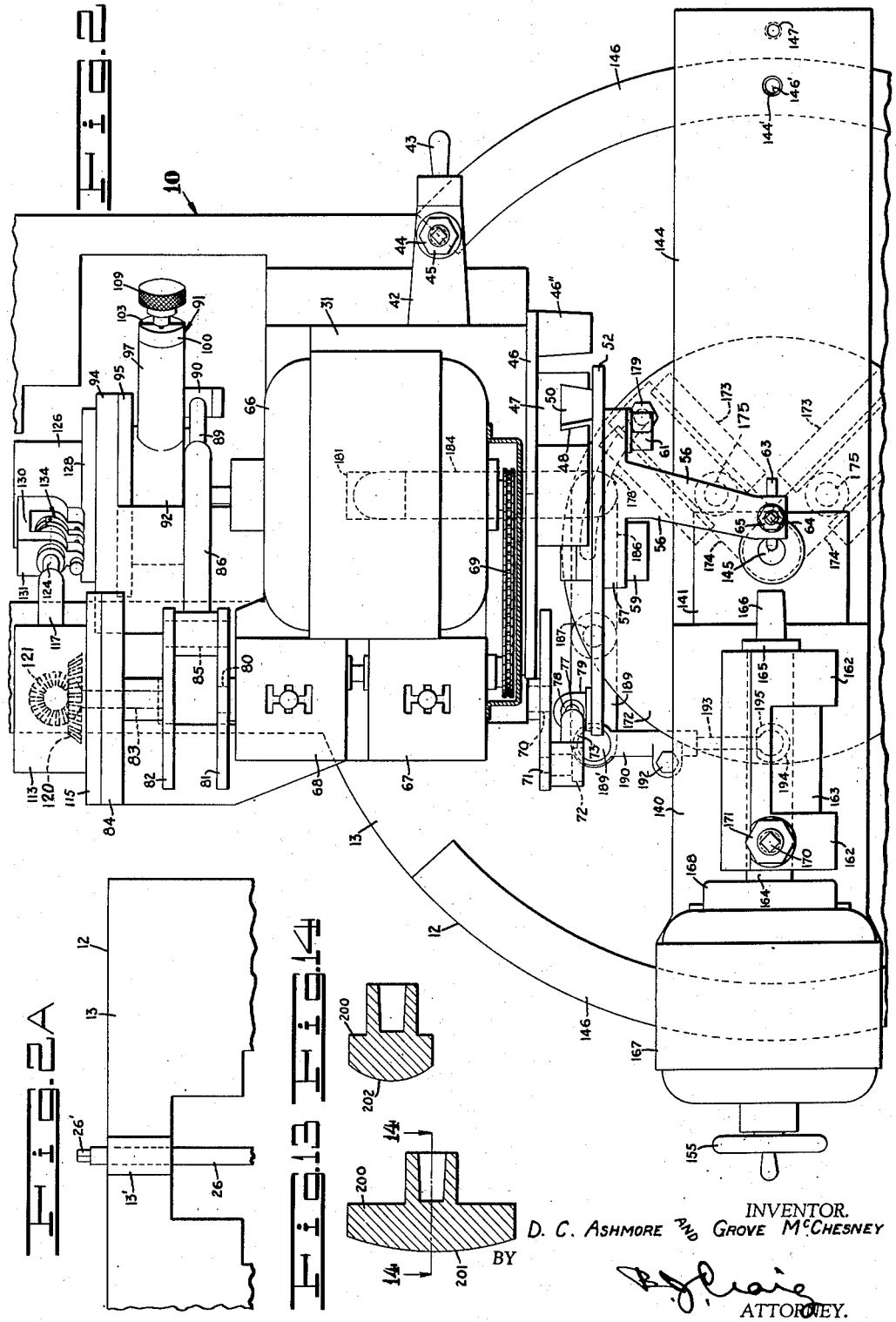

Dec. 15, 1942. D. C. ASHMORE ET AL 2,305,055
MACHINE GENERATING CURVED SURFACES
Filed Aug. 17, 1940 6 Sheets-Sheet 3
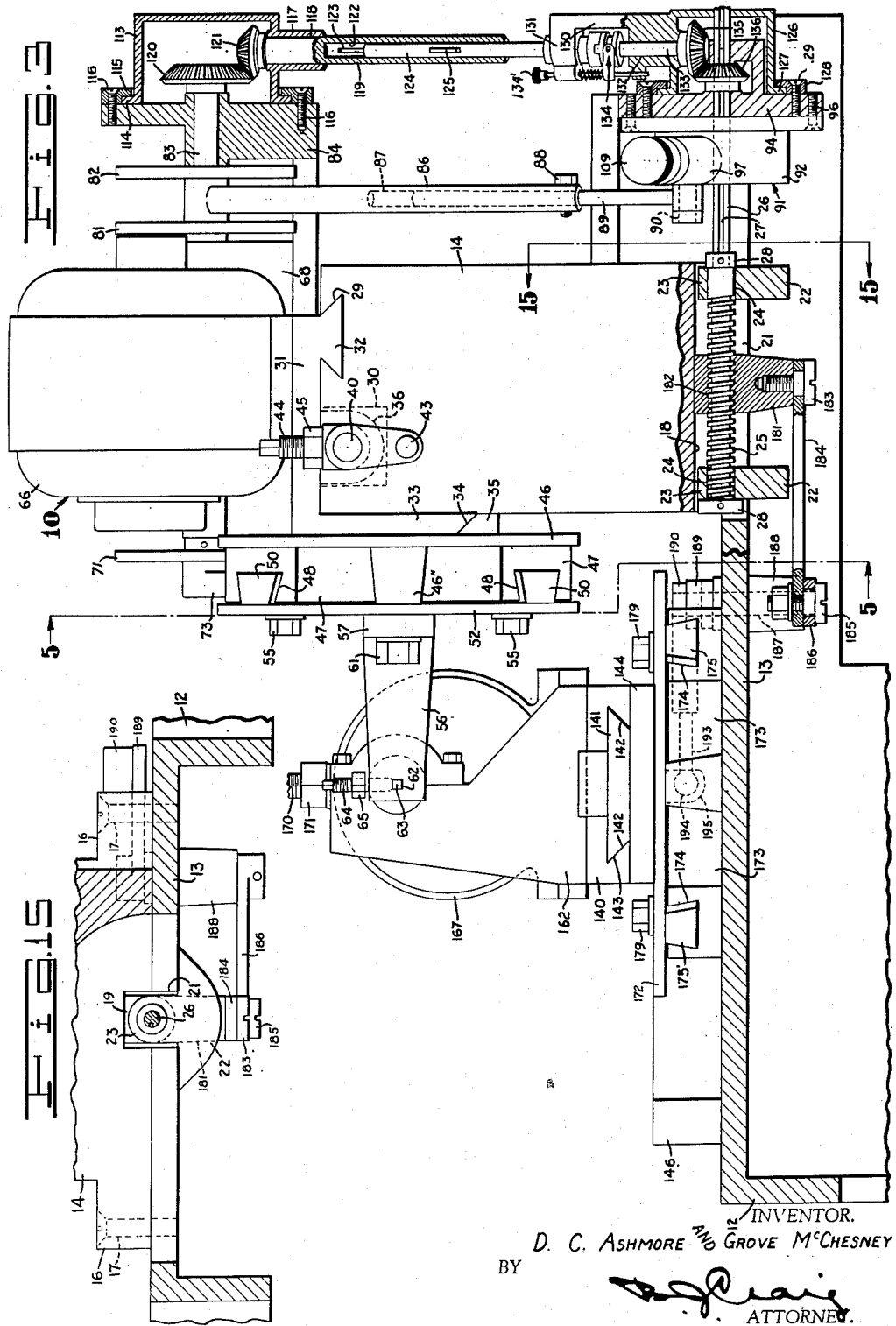
INVENTOR.
D. C. ASHMORE AND GROVE McCHESNEY
BY
ATTORNEY.

Dec. 15, 1942.  D. C. ASHMORE ET AL  2,305,055
MACHINE GENERATING CURVED SURFACES
Filed Aug. 17, 1940  6 Sheets-Sheet 4
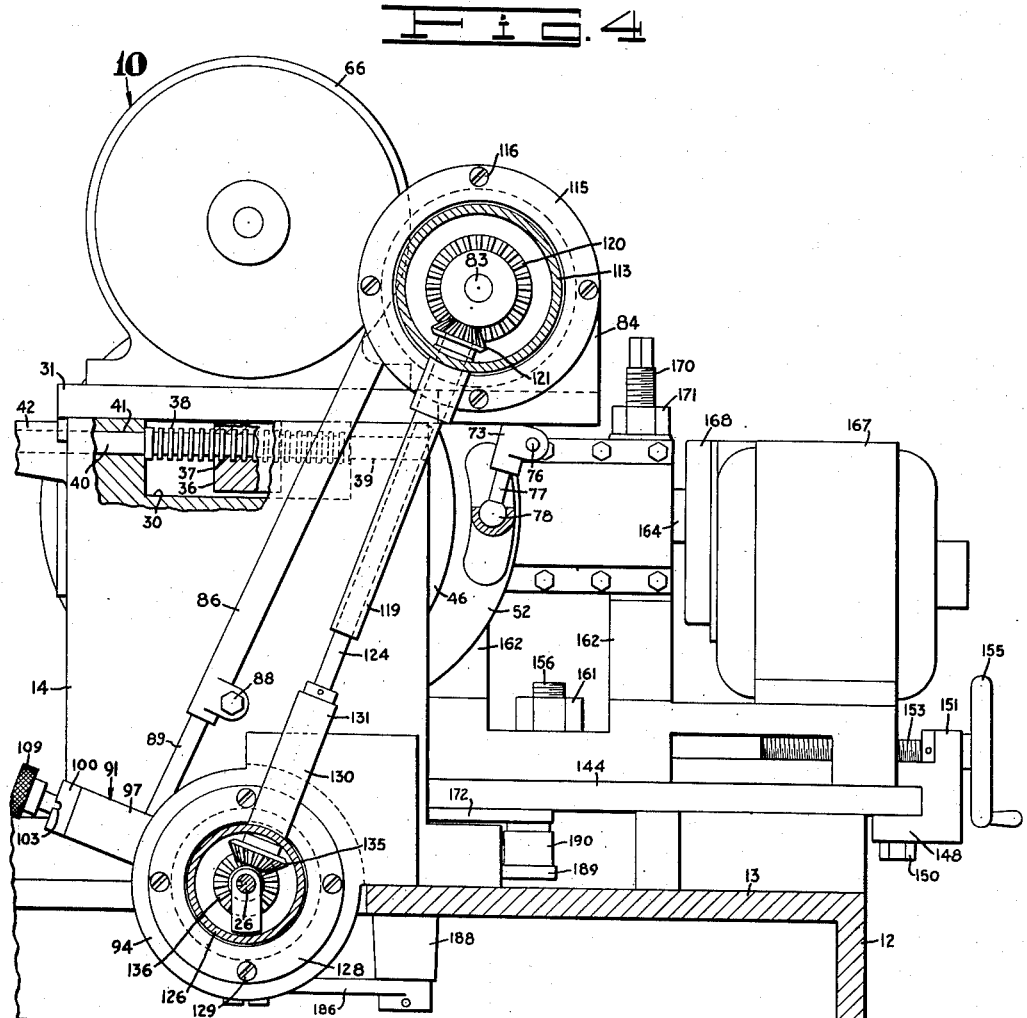
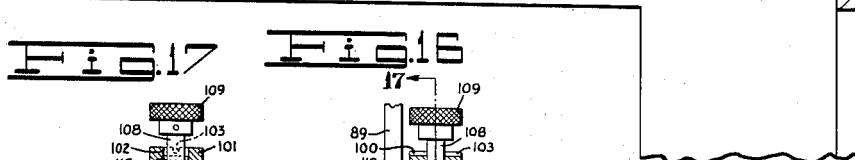
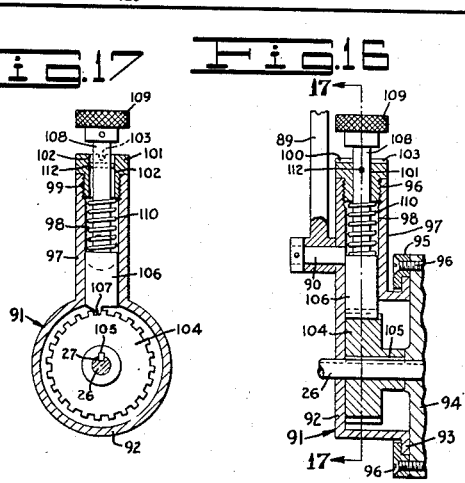
INVENTOR.
D. C. ASHMORE AND GROVE McCHESNEY
BY
ATTORNEY.

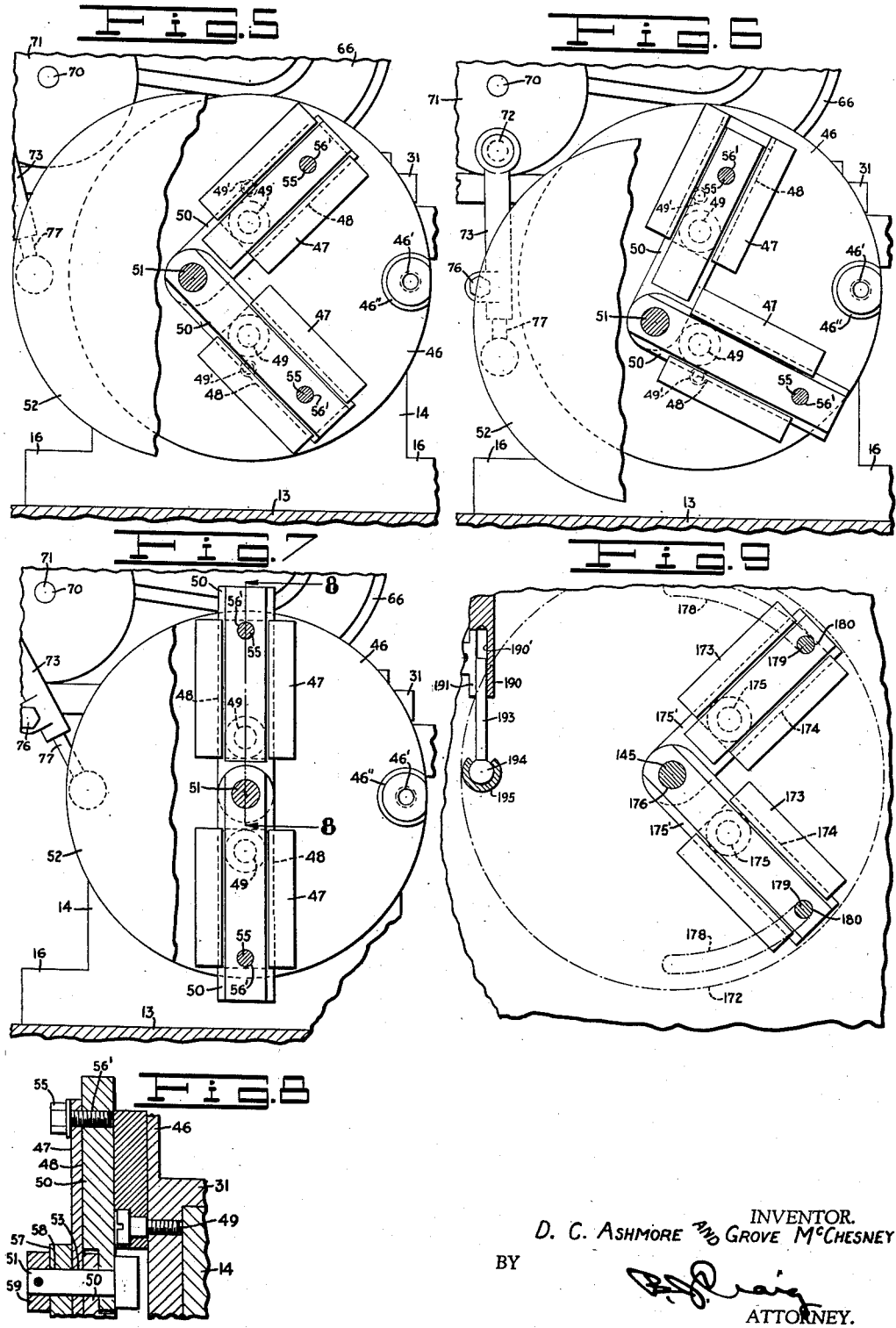

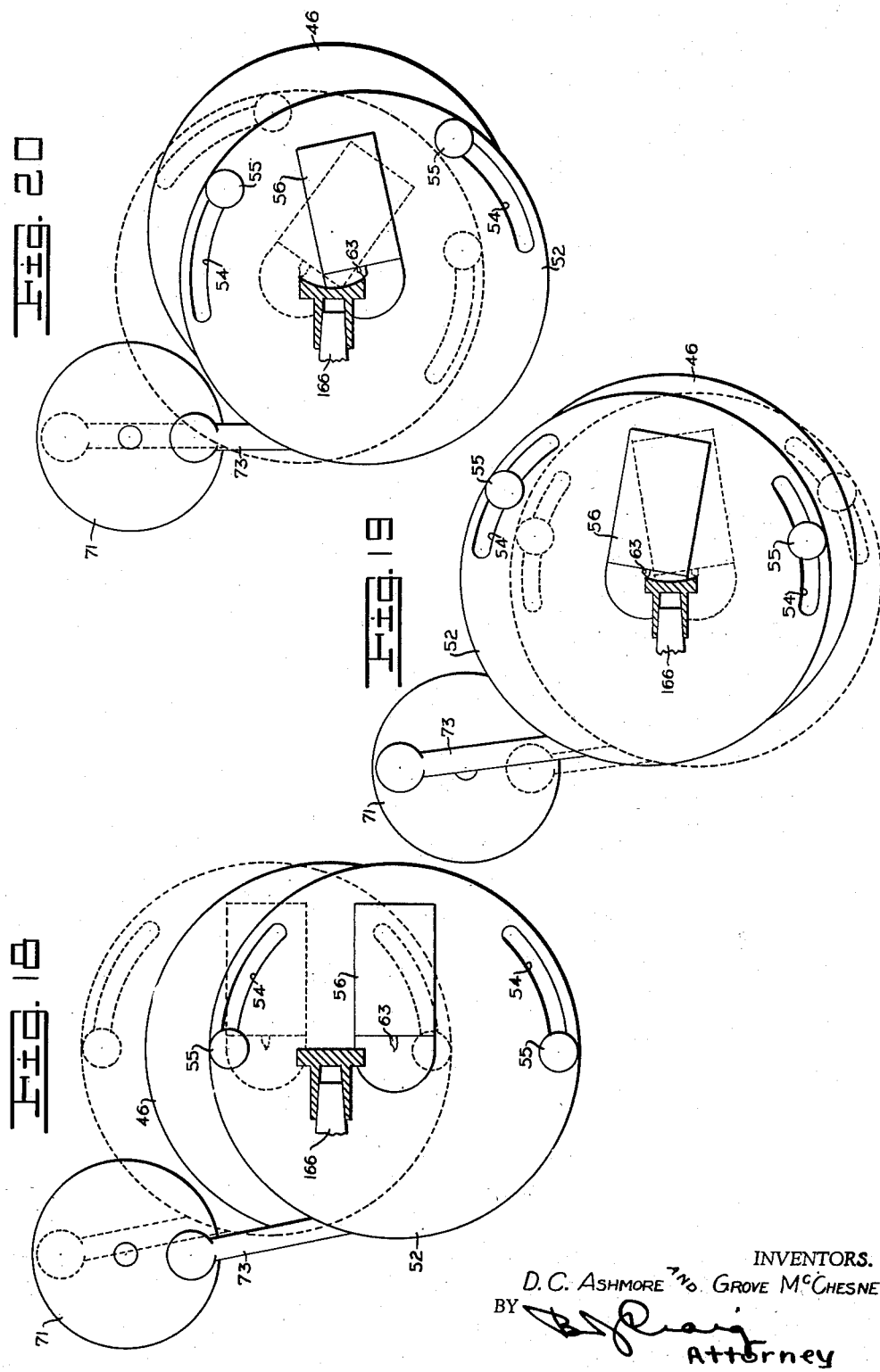

Patented Dec. 15, 1942

2,305,055

UNITED STATES PATENT OFFICE 2,305,055

MACHINE GENERATING CURVED SURFACE

Donald C. Ashmore, Pasadena, and Grove McChesney, Sierra Madre, Calif.

Application August 17, 1940, Serial No. 353,084

18 Claims. (Cl. 82—12)

This invention relates to improvements in machines for forming curved surfaces.

The general object of this invention is to provide a machine for forming arcuate surface having radii from a predetermined short radius to an infinite radius.

Another object of the invention is to provide a curved surface forming machine including novel means for moving the work during the forming operation.

A further object of the invention is to provide a curved surface forming machine wherein novel means is provided for moving the cutting member.

An additional object of the invention is to provide an apparatus for producing a curved surface wherein novel interrelated work feeding members and cutter feeding members are employed.

Another object of the invention is to provide an apparatus for forming curved surfaces wherein novel means is provided for adjusting the radius of curvature.

A more specific object of the invention is to provide an improved machine for forming arcuate surfaces on tools for grinding optical lenses.

Other objects and the advantages of this invention will be apparent from the following description taken in connection with the accompanying drawings, wherein:

Fig. 1 is a fragmentary front view of our improved curved arcuate surface forming machine;

Fig. 2 is a fragmentary top plan view of the machine;

Fig. 2A is a fragmentary top plan view of the rear portion of the machine;

Fig. 3 is a fragmentary side elevation partly in section showing the machine;

Fig. 4 is a fragmentary rear view partly in section showing the machine;

Fig. 5 is a fragmentary section taken on line 5—5, Fig. 3 with parts broken away showing vertical arc controlling guide members in an intermediate stroke position;

Fig. 6 is a view similar to Fig. 5 with the parts at the lower limit of movement;

Fig. 7 is a view similar to Fig. 5 showing the vertical arc controlling guide members moved to an aligned vertical position;

Fig. 8 is a fragmentary section taken on line 8—8 of Fig. 7;

Fig. 9 is a fragmentary section taken on line 9—9 of Fig. 1 showing the horizontal arc controlling guide members in an intermediate stroke position;

Fig. 10 is a sectional detail of one of the drive arms;

Fig. 11 is a section through a concave lens grinding tool showing it mounted on the spindle of the machine;

Fig. 12 is a side elevation of a convex lens grinding tool showing it mounted on the spindle of the machine;

Fig. 13 is a longitudinal section through a lens grinding tool having two convexly curved surfaces;

Fig. 14 is a section taken on line 14—14 of Fig. 13;

Fig. 15 is a section taken on line 15—15 of Fig. 3;

Fig. 16 is a longitudinal section through the intermittent feed device;

Fig. 17 is a section taken on line 17—17 of Fig. 16; and

Fig. 18 diagrammatically illustrates the movement of the tool when the slide bars form a straight angle;

Fig. 19 diagrammatically illustrates the movement of the tool when the slide bars form an oblique angle; and Fig. 20 diagrammatically illustrates the movement of the tool when the slide bars form a right angle.

Referring to the drawings by reference characters we have indicated our improved curved surface forming machine generally at 10. As shown the machine includes a base or support member 12. The base includes an upper plate portion 13 having a head member 14 thereon.

At the bottom thereof and extending outwardly from each side thereof the head includes flange portions 16 (see Fig. 15) secured to the base plate 13 by screws 17 and the bottom of the head 14 has a recess 18 (see Fig. 3) therein.

Below the recess 18 the plate 13 has an aperture 21 therein. The aperture 21 is bridged by a pair of spaced ribs 22 (see Figs. 3 and 15) which includes upwardly extending boss portions 23 positioned in the head recess 18 and having aligned apertures 24 therein.

A threaded shaft 25 is supported in the apertures 24 by the bosses 23.

The shaft 25 includes a rearwardly extending reduced shaft portion 26 having a keyway 27 therein. Longitudinal movement of the shaft 25 is prevented by collars 28 secured thereto and engaging the outer faces of the bosses 23. The rear portion of the shaft 26 is supported by a bearing portion 13' (Fig. 2A) on the top plate 13 and the rear end of the shaft includes a polyonal portion 26' on which a removable handle (not shown) may be positioned to rotate the shaft by hand.

Adjacent the rear thereof the head member 14 has an open topped dove-tailed groove 29 therein and adjacent the front it has an open topped elongated recess 30 therein intermediate its width.

Mounted on top of the head member we provide a transversely movable carriage 31 which includes a depending dove-tailed guide boss portion 32 positioned in the dove-tailed groove 29 of the head. The carriage 31 further includes a depending plate portion 33 the rear of which engages the front of the head 14. The lower end of the plate 33 is beveled as at 34 and is engaged by a similarly beveled guide bar 35 secured to the head. The carriage 31 includes a boss 36 depending into the recess 30 and having a threaded aperture 37 therein in which a threaded shaft 38 is positioned.

One end of the shaft 38 is rotatably supported in an aperture 39 in the head 14 and at the opposite end the shaft includes a reduced portion 40 positioned in an aperture 41 in the body of the head and in an extended boss 42 thereon. The outer end of the reduced shaft 40 has a hand crank member 43 secured thereto for rotating the same. A set screw 44 (Figs. 1 and 3) and lock nut 45 are provided adjacent the outer end of the boss 42 to prevent rotation of the shaft 40 when so desired.

The downwardly extending plate 33 (Fig. 3) of the carriage 31 includes an enlarged circular face plate 46 rigidly secured thereto.

Mounted on the face plate 46 we provide a pair of spaced guide members 47 each of which has a dove-tailed groove 48 therein (see Figs. 5, 6, and 7). The guides 47 are pivotally mounted as at 49 (see Figs. 5, 6, 7, and 8) on the vertical axis of the face plate a predetermined distance above and below the horizontal axis of the face plate. Other positions such as 49' may be provided to alter the action of the guides.

Positioned in the dove-tailed groove 48 of each of the guides 47 we provide a dove-tailed slide bar 50. Intermediate the guides 47 the slide bars 50 overlap and are pivotally connected by a pin 51. Positioned in front of the guides we provide a movable circular plate 52 having a central aperture 53 therein (see Fig. 8) in which the pin 51 is positioned. Adjacent the top and bottom thereof the plate 52 has elongated arcuate apertures 54 therein (Fig. 1) in each of which a bolt 55 is positioned which engages a suitably threaded aperture 56' in each of the slide bars 50 for securing it to the plate 52.

Thus it will be seen that the guides 47 are pivotally connected to the face plate 46 and the slide bars 50 are connected to the plate 52 by the bolts 55 and the pin 51.

Mounted on the movable plate 52 we provide a tool post 56 which includes a flange-like base portion 57 having an aperture 58 therein (see Fig. 8) in which the pin 51 is positioned.

A collar 59 secured to the pin 51 retains the tool post base in engagement with the plate 52.

Adjacent each side on the horizontal axis thereof the plate 52 includes a threaded aperture 60 to receive a bolt 61 for securing the tool post in one of two positions.

Adjacent the outer end the tool post 56 has an aperture 62 therein (Fig. 3) to receive a cutting tool 63 which is adapted to be rigidly clamped to the tool post by a set screw 64 and a lock nut 65.

Mounted on the carriage 31 we provide an electric motor 66 which drives two variable speed transmissions 67 and 68 of any suitable type through the medium of a chain and sprocket drive means 69.

Mounted on the drive shaft 70 of the transmission 67 we provide a drive disc 71 positioned forward of the face plate 46.

Pivotally mounted on the disc 71 as at 72 we provide a drive arm 73 having an elongated circular recess 74 therein. As shown in Fig. 10 the outer portion of the arm 73 has a slot 75 in one side thereof and is adapted to be clamped together by a bolt 76.

Positioned in the recess 74 of the arm 73 we provide a rod 77 having a ball head 78 thereon which is positioned in a ball socket 79 on the rear face of the movable disc 52 (see Fig. 4). In operation the rod 77 is firmly clamped to the arm 73 by the bolt 76.

Our invention as relating to the movement of the disc 52 is based upon the geometrical theorem that if an angle equal to or greater than a right angle is shifted so that the arms thereof continuously bear against two fixed points on the circumference of a circle, the vertex of said angle will describe an arc of a circle, the radius of which is variable between the limits defined by the angle so moved, the smaller radius being defined by the vertex of the right angle and being equal to the radius of the circle containing the fixed points, and the larger radius being defined by a straight angle, the radius of which is infinity.

Thus it will be seen that when the motor 66 is operating and the transmission 67 is set to drive the shaft 70 the disc 71 will rotate and impart a crank action to the arm 73 which in turn through the rod 77 will oscillate the movable plate 52 vertically. As the plate 52 is thus moved the pin 51 moves the slide bars 50 and as they move within the guides 47 the guides rock on their pivots 49. This action of the slide bars and guides causes the tool post 56 to move in an arc disposed in a vertical plane the radius of which arc is determined by the angle at which the slide bars are set relative to the vertical axis of the movable plate 52.

Mounted on the drive shaft 80 of the transmission 68 we provide a disc 81.

Spaced rearwardly from the disc 81 we provide a disc 82 which is mounted on a shaft 83 journaled in a bearing bracket 84 on the carriage 31.

The discs 81 and 82 are connected by a crank pin 85 (see Figs. 2 and 3) on which an arm 86 is pivotally mounted. The arm 86 has an elongated cylindrical recess 87 therein and the end of the arm is split similar to the arm 73 and is adapted to be clamped tight by a bolt 88.

Positioned in the recess 87 of the arm 86 we provide a rod 89 which is pivotally connected as at 90 to an intermittent feed device which is indicated generally at 91 and shown in detail in Figs. 16 and 17.

As shown the feed device 91 includes a housing 92 surrounding the shaft 26. The housing 92 includes an enlarged annular flange 93 which bears against the forward face of a bracket 94 which extends rearwardly from the head 14. A split clamp ring 95 secured to the bracket 94 by screws 96 retains the housing flange 93 in position.

The housing 92 includes an extended neck portion 97 having an aperture 98 therein opening into the housing portion. The outer end of the neck aperture 98 is threaded as at 99 to receive a similarly threaded closure plug 100.

The plug 100 has a reduced aperture 101 therein opening into the aperture 98 and opening into the aperture 101 the plug has a pair of opposed longitudinal grooves 102. In the outer end thereof the plug has a transverse groove 103 therein positioned at right angles to the grooves 102.

Mounted on the shaft 26 wihin the housing 92 we provide a ratchet wheel 104 which is connected to the shaft by a key 105 positioned in the keyway 27.

Positioned in the aperture 98 we provide a plunger 106 the lower end of which is formed into a beveled tooth 107 to engage the ratchet teeth. The opposite end of the plunger includes a reduced shank 108 which extends through the plug aperture 101 and has an enlarged head member 109 thereon.

Within the aperture 98 and surrounding the shank 108 between the plunger and the inner end of the plug 100 we provide a coiled spring 110 which resiliently urges the plunger towards the ratchet 104.

Intermediate its length the shank 108 has a transverse pin 112 therein the ends of which extend beyond the sides of the shank into the grooves 102 when the plunger is in a driving position.

To move the plunger out of engagement with the ratchet 104 an operator moves the shank outward and turns it right angles and lowers the pin 112 into the groove 103.

Thus it will be seen that when the discs 81 and 82 rotate they oscillate the arm 86 and rod 89 which in turn rocks the feed device 91 back and forth about the axis of the shaft 26. When the drive device 91 is thus rocked back and forth it moves the plunger 106 which through the medium of the ratchet 104 rotates the shaft 26 which in turn rotates the threaded shaft 25 a predetermined distance for a purpose to be described hereinafter. By retracting and rotating the plunger through 180 degrees the direction of rotation of the shaft 26 may be reversed.

Mounted on the rear of the bearing bracket 84 of the carriage 31 we provide a housing member 113 (see Fig. 3) having an enlarged annular flange 114 thereon which is engaged by a split retaining ring 115 secured to the bracket 84 by screws 116. The housing 113 includes an extended boss 117 having an aperture 118 in which a shaft 119 is positioned. Within the housing 113 we provide a bevel gear 120 on the shaft 83 which meshes with a bevel gear 121 on the shaft 119.

The shaft 119 has an elongated recess 122 therein and has opposed spline keyways 123 opening into the recess.

Positioned in the shaft recess 122 we provide a reduced shaft 124 which includes opposed splines 125 positioned in the spline keyways of the shaft 119.

Mounted on the rear of the bracket 94 we provide a housing member 126 having an enlarged circular flange 127 thereon which is engaged by a split retaining ring 128 secured to the bracket 94 by screws 129.

The housing 126 includes an extended arm 130 the outer portion of which forms a bearing portion 131 in which the shaft 124 is journaled. Aligned with the shaft 124 the housing has an aperture 132 therein in which a shaft 133 is positioned. The shafts 124 and 133 are releasably coupled together by a clutch mechanism 134 which includes an operating member 134'.

Mounted on the shaft 133 within the housing 126 we provide a bevel gear 135 which meshes with a bevel gear 136 which is slidable on the shaft 26 and splined thereto.

Thus it will be seen that when the clutch mechanism 134 is engaged and the shaft 83 is rotated by the disc 82 the gear 120 will rotate the shaft 119 through the medium of the gear 121 and the shaft 119 will rotate the shaft 124 which through the clutch mechanism 134 will rotate the shaft 133. When the shaft 133 rotates the gear 135 thereon rotates the gear 136 which in turn rotates the shaft 26 for a purpose to be described hereinafter.

When the continuous feed mechanism is used the plunger 106 of the intermittent feed device 91 is moved to an inoperative position as previously described and when the intermittent feed device 91 is used the clutch mechanism 134 of the continuous feed mechanism is disengaged.

Spaced a predetermined distance forward of the face plate 52 we provide a transversely movable carriage 140 which is mounted on a plate 141 having beveled sides 142 fitting within a dove-tailed recess 143 in the lower face of the carriage 140.

The plate 141 is pivotally mounted on a supporting bar 144 by a pin 145 and the bar 144 is slidably mounted on arcuate support members 146 extending upwardly from the base plate 13. Adjacent each end the bar 144 has a threaded aperture 147 therein.

The outer end of the plate 141 includes a downwardly and then inwardly directed lug 148 which has an aperture 149 therein to receive a bolt 150 which is positioned in one or the other of the threaded apertures 147 of the bar 144 to rigidly secure the plate 141 to the bar 144.

Adjacent the outer end the plate 141 includes an upwardly extending lug 151 having an aperture 152 therein in which a threaded bar 153 is rotatably supported. Adjacent the outer end the carriage 140 has a threaded aperture 154 therein in which the threaded rod 153 is positioned. The outer end of the rod 153 has a hand wheel 155 thereon by means of which the threaded rod may be rotated to move the carriage 140.

For clamping the carriage 140 to the plate 141 we provide a bolt 156 the head 157 of which is positioned in an elongated recess 158 opening through the bottom of the plate 141 and the shank of the bolt 156 is positioned in an aperture 159 in the plate 141 and an aperture 160 in the carriage 140 above and has a nut 161 thereon.

The carriage 140 includes spaced upwardly projecting brackets 162 which support a bearing portion 163 in which a shaft 164 is journaled. The inner end of the shaft 164 includes an enlarged flange portion 165 and terminates in a work holding tapered spindle 166.

The shaft 164 is shown as adapted to be driven by a variable speed electric motor 167 which includes a suitable speed reduction transmission mechanism 168.

The outer bracket 162 has a threaded aperture 169 therein to receive a set screw 170 for clamping the shaft 164 in a fixed position when so desired and the set screw has a lock nut 171 thereon.

Coaxial with the pin 145 the bar 144 includes an enlarged circular plate 172 integral therewith and similar to the plate 52. Mounted on the base plate 13 below the plate 172 we provide a pair of spaced guide members 173 each of which has a dove-tailed groove 174 therein. Each guide member 173 is pivotally mounted as at 175 on the base plate 13 to turn about vertical axes aligned with the horizontal axes of the pivots 49 of the previously described guide members 47 to which they are similar.

Positioned in the dove-tailed groove 174 of each of the guides 173 we provide a dove-tailed slide bar 175'. Intermediate the guides the slide bars overlap and each has an aperture 176 therein in which the pin 145 is positioned.

Adjacent the front and rear thereof the circular plate portion 172 of the bar 144 has an elongated arcuate aperture 178 therein in each of which a bolt 179 is positioned. Each bolt 179 is arranged in a suitably threaded aperture 180 in one of the slide bars 175' for securing the latter to the plate 172. Thus it will be seen that the guides 173 are pivotally connected to the base plate 13 and the slide bars 175' are connected to the bar 144 by the pin 145 and that the slide bars are connected to the circular plate 172 by the bolts 179.

Mounted on the previously described threaded feed shaft 25 we provide a feed block 181 having a threaded aperture 182 therein in which the shaft 25 is positioned.

Pivotally secured to the feed block 181 as at 183 we provide an arm 184 which is pivotally connected as at 185 to a transversely extending arm 186 which in turn is secured to a vertical shaft 187 mounted in a boss 188 on the plate 13.

The shaft 187 extends above the base plate 13 where it has a transversely extending arm 189 thereon.

Pivotally mounted on the arm 189 as at 189' we provide a drive arm 190 having an elongated cylindrical recess 190' therein. As shown in Fig. 9 the outer portion of the arm 190 has a slot 191 in one side thereof and is adapted to be clamped by a bolt 192.

Positioned in the recess 191' of the arm 190 we provide a rod 193 having a ball head 194 thereon which is positioned in a ball socket 195 depending from the plate 172. In operation the rod 193 is firmly clamped to the arm 190 by the bolt 192.

Thus it will be seen that when the feed screw 25 is rotated by either the previously described intermittent or constant feed means the feed block 181 will move and thereby move the arm 184 which in turn will swing the arm 186 and rotate the shaft 187. When the shaft 187 rotates it swings the arm 189 which in turn moves the drive arm 190 and the rod 193 which through the medium of the ball 194 and socket 195 moves the disc 172.

The movement of the disc 172 is also based upon the geometrical theorem that if an angle equal to or greater than a right angle is moved so that its arms continuously bear against two fixed points, the vertex of said angle will describe an arc of a circle the radius of which is variable between the limits defined by the angle so moved.

As the disc 172 is thus moved the pin 145 moves the slide bars 175' and as they move within the guides 173 the guides rock on their pivots 175. This action of the slide bars and guides causes the bar 144 to move in a horizontal arc the radius of which is determined by the angle at which the slide bars are set.

The machine 10 is particularly adapted for making lens grinding tools such as shown in Figs. 11 to 14 inclusive.

In Fig. 11 we have shown a lens grinding tool 196 having a concave grinding surface 197 and in Fig. 12 we have shown a lens grinding tool 198 having a convex grinding surface 199.

In Figs. 13 and 14 we have shown a lens grinding tool 200 of the convex type wherein the longitudinal surface 201 is an arc of one radius and the transverse surface 202 is an arc of a different radius.

To make the lens grinding tool 196 shown in Fig. 11 the tool blank is placed on the spindle 166 and the set screw 170 backed off. The bolts 55 are loosened and the plate 52 moved coaxial with the face plate 46 and secured thereto by a bolt (not shown) positioned in an aperture 52' in the plate 52 and in a threaded aperture 46' of a boss 46" on the face plate 46 locking the plate 52 in a central position and thus moving the slide bars 50 into vertical alignment. The tool post 56 is positioned at the right of the axis of the plate 52 as shown in Fig. 1.

The set screw 44 is loosened and the head moved towards the work by rotating the hand crank 43. The slide bars 175' are then set at the correct angle for the desired arc and clamped in place by the bolts 179. The transmission 67 is shifted into neutral position to prevent motion of the disc 71 by the motor 66. Either the intermittent feed device 91 is moved to operative position or the clutch 134 of the continuous feed mechanism is engaged. The motor 66 and the motor 167 are started. The motor 167 rotates the shaft 164 thereby rotating the work and the motor 66 actuates the disc 172 in an arcuate movement as previously described. As the work is fed toward the tool 63 by means of the hand crank 155 or as the tool 63 is fed towards the work by hand crank 43 a concave surface 197 is cut therein by the rotation and oscillation of the work.

This same operation may be performed by setting the bar 144 in a neutral position and securing it to the supports 146 by a bolt (not shown) which is positioned in an aperture 144' of the bar 144 and in a threaded aperture 146' in the support 146.

The bolts 55 are loosened and the slide bars 50 moved to the correct position for the desired arc and then the bolts 55 are again tightened. The transmission 68 is set in neutral and the transmission 67 is set in slow. The motor 167 is started for rotating the work and the motor 66 is started and operates the plate 52 as previously described thereby moving the tool 63 in a vertically arcuate path. The tool is fed towards the work by the hand crank 43.

To form the convex lens grinding tool 198 shown in Fig. 12 the bolt 150 is removed and the plate 141 moved around to the right side of the machine and the bolt 150 placed in the threaded aperture 147 on the right side. The bolt 61 is removed and the tool post 56 is swung around to the left side of the machine and the bolt positioned in the threaded aperture 60 on that side of the plate 52. Thereafter the convex surface 199 may be cut on the work either by oscillating the bar 172 or by oscillating the plate 52 as previously described.

To form the double arc convex lens grinding tool 200 shown in Figs. 13 and 14 the carriage 140 is on the right side of the machine and the tool post 56 is arranged on the left side the same as when making the lens grinding tool 198.

The slide bars 50 are set at the correct angle to produce the desired vertical arc and the slide bars 175 are set at the desired angle to form the desired horizontal arc and the set screw 170 is tightened to firmly hold the shaft 164. The clutch mechanism 134 is disengaged and the plunger 106 of the intermittent feed mechanism is set to engage the teeth of the ratchet 104 after placing the cutting tool 63 to the far side of the work, the transmissions 67 and 68 are set and then the motor 66 is started to oscillate the plate 52. As the machine continues to operate the tool 63 forms the vertical arc surface 201 on the work.

At the same time the disc 172 is moved as previously described by the intermittent feed device and as the work is fed horizontally across the tool 63 it describes a horizontal arc to form the surface 202.

To form a double arc concave lens grinding tool (not shown) the plate 141 is moved to the left side and the tool post is moved to the right side as in forming the concave lens grinding tool 196. The plates 52 and 172 operate in the same manner as described in connection with the lens grinding tool 200.

In Figs. 18, 19 and 20 we show diagrammatically the movement of the tool 63 for various settings of the pins 55 in the slots 54. In Fig. 18 movement of the tool when the slide bars form a straight angle is illustrated. In Fig. 19 tool movement when the slide bars form an oblique angle is illustrated. In Fig. 20 tool movement when the slide bars form a right angle is illustrated.

Although we have described the machine 10 as being adapted to form lens grinding tools it will be understood that the machine can be used for various other purposes.

From the foregoing description it will be apparent that we have provided a novel curved surface forming machine which is simple in construction and highly efficient in use.

Having thus described our invention, we claim:

1. In an apparatus for producing curved surfaces, a base, a head member, a carriage, means to mount the carriage for linear movement on said head member, a tool mounted on said carriage, means to mount said tool for movement in an arcuate path relative to said carriage, a work holding carriage, means to move the work holding carriage on said base, means to rotate a piece of work held in said work holding carriage, means to oscillate said work holding carriage in an arcuate path, and means to adjust the radius of said path.

2. In an apparatus for producing curved surfaces, a base, a head member, a motor carriage, a motor on said carriage, means to mount the motor carriage for linear movement on said head member, a tool mounted on said motor carriage, means to mount said tool for movement in an arcuate path relative to said motor carriage, means to adjust the radius of the path, a carriage plate mounted on said base, a work holding carriage slidable on said carriage plate, means to rotate a piece of work in said work holding carriage, means to oscillate said work holding carriage arcuately, means to adjust the radius of the carriage arcuate movement, the plane of the path of movement of the work holding carriage being perpendicular to the path of movement of the tool.

3. In an apparatus for producing a curved surface, a support, a pair of guide members pivotally mounted on said support and slidable across the face thereof, a slide member engaging each of said guide members, means pivotally connecting the slide members at one end thereof, a movable plate mounted on said second mentioned pivot means, said movable plate including arcuate slots, each slide member including a portion engaging in one of said arcuate slots, means to oscillate said movable plate, and a tool mounted on said movable plate, said tool describing an arcuate path upon oscillation of said movable plate.

4. In an apparatus for producing a curved surface, a face plate, a pair of guide members pivotally mounted on said face plate and slidable across the face thereof, a slide member engaging each of said guide members, said slide members overlapping at one end thereof, a pin pivotally connecting the slide members, a plate mounted on said pin, said plate including arcuate slots, each slide member including a portion slidable in said arcuate slots, means to oscillate said plate, a tool mounted on said plate, and means to support a piece of work adjacent said tool.

5. In an apparatus for producing a curved surface, a face plate, a pair of guide members pivotally and adjustably mounted on said face plate and slidable across the face thereof, a slide member engaging each of said guide members, said slide members overlapping at one end thereof, a pin pivotally connecting the slide members, a movable plate mounted on said pin, a fixed pin on each of said slide members on the ends remote from said first pin, said movable plate including arcuate slots, said second mentioned pins engaging in said arcuate slots, means to oscillate said movable plate, a tool mounted on said movable plate, said tool describing an arcuate path upon oscillation of said movable plate, the radius of said path being dependent upon the position of said second mentioned pins in said arcuate slots, and means to support a piece of work adjacent said tool.

6. In an apparatus for producing a curved surface, a base, a head member, a motor carriage, means to mount the carriage for movement in a linear path on said head member, a pair of variable speed transmissions mounted on said motor carriage and adapted to be selectively driven by a motor, a plate mounted for oscillation on said head member, a tool mounted on said plate, means movable on said base supporting a piece of work, a crank on the output shaft of one of said transmissions, a connecting rod disposed between said crank and said plate to oscillate the latter, means to adjust the length of said rod, means controlling the movement of said supporting means, and means to connect the output shaft of the other of said transmissions to said controlling means.

7. In an apparatus for producing a curved surface, a base plate, a head on said base plate, a tool mounted on said head, a carriage movably mounted for oscillation on said base plate, means on said carriage adapted to support a piece of work, a feed screw shaft mounted on said base plate, means to either intermittently or continuously drive said feed shaft, means operatively connecting said feed shaft and said carriage for movement of the latter, a shaft on said head, means to drive said shaft, a crank on said driven shaft, an intermittent feed device on said screw shaft, and means operated by said crank for actuating said intermittent feed device.

8. In an apparatus for producing a curved surface, a base plate, a head on said base plate, a tool mounted on said head, a carriage movably mounted on said base plate, means on said carriage adapted to support a piece of work, a feed screw shaft mounted on said base plate, means operatively connecting said feed shaft and said carriage for movement of the latter, a shaft on said head, a motor driving said shaft, a gear train and a clutch disposed between said motor driven shaft and said screw shaft, a crank on said motor driven shaft, an intermittent feed device on said screw shaft, said feed device comprising a ratchet wheel mounted on said screw shaft, a housing about said ratchet wheel and mounted for oscillation about said screw shaft, a rod connecting said crank and said housing producing oscillation of the latter, a ratchet mounted in said housing and engaging said ratchet wheel thus producing intermittent rotation of said screw shaft, and means to disengage said ratchet.

9. In an apparatus for producing curved surfaces, a base, a head mounted on said base, a tool mounted on said head, a crank, a carriage plate slidably mounted for oscillation on said base, means to drive said crank, a connecting rod disposed between said crank and said carriage plate to produce oscillation of the carriage plate, means to adjust the length of the connecting rod, a carriage slidably mounted on said carriage plate, means limiting the movement of said carriage on said carriage plate, a motor driven shaft on said carriage, and means to support a piece of work on said shaft adjacent said tool.

10. In an apparatus for producing curved surfaces, a base, a head on said base, a tool mounted for movement on said head, a carriage plate movably mounted on said base, a face plate mounted on said base, a pair of guide members pivotally mounted on said face plate, a slide member engaging each of said guide members, pivot means connecting said slide members at one end thereof, said carriage plate engaging said pivot means, a member on each of said slide members at the end remote from said pivot means, said carriage plate having arcuate slots therein securing said members, means to oscillate said carriage plate, a carriage movably mounted on said carriage plate, means on said carriage to support a piece of work, and means to move said work.

11. In an apparatus for producing curved surfaces, a base, a head mounted on said base, a tool mounted on said head, a carriage plate slidably mounted for oscillation on said base, a motor on said head, a crank driven by said motor, mechanism including a connecting rod disposed between said crank and said carriage plate to produce oscillation of the carriage plate, means to adjust the length of the connecting rod, a carriage slidably mounted on said carriage plate, means controlling the movement of said carriage on said carriage plate, a motor driven shaft on said carriage, means to support a piece of work on said shaft adjacent said tool, means to clamp said shaft in fixed position, means to clamp said carriage in fixed position, and means to clamp said carriage plate in fixed position.

12. In an apparatus for producing curved surfaces, a base plate, a head on said base plate, a tool mounted for movement on said head, a carriage plate movably mounted on said base plate, a face plate mounted on said base plate, a pair of guide members pivoted on said face plate, a slide member engaging each of said guide members, means pivotally connecting said slide members at one end thereof, said carriage plate engaging said pivoted means, said carriage plate having arcuate slots therein, said slide members each including means engaging said arcuate slots in said carriage plate, means to oscillate said carriage plate, a carriage mounted on said carriage plate, and means on said carriage to support a piece of work, means to mount said carriage for movement relative to said tool, means to rotate said work, oscillation of said carriage plate producing arcuate movement of said work, the radius of the path of the work being dependent upon the position of said slide member means in said arcuate slots.

13. In an apparatus for producing curved surfaces, a base plate, a head on said base plate, a tool mounted for arcuate movement on said head, a carriage plate movably mounted on said base plate, a face plate mounted on said base plate, a pair of guide members pivoted to said face plate, a slide member engaging each of said guide members, a pin pivotally connecting said slide members at one end thereof, said carriage plate engaging said pin, a pin on each of said slide members at the end remote from said first mentioned pin, said carriage plate having arcuate slots therein, said second mentioned pins being slidable in said arcuate slots in said carriage plate, means to oscillate said carriage plate, a carriage mounted on said carriage plate, means on said carriage to support a piece of work, said carriage being slidable on said carriage plate for moving said work relative to said tool, means to rotate said work, oscillation of said carriage plate producing arcuate movement of said work, the path of movement of said work being perpendicular to the path of movement of said tool, the radius of the path of the work being dependent upon the position of said second mentioned pins in said arcuate slots.

14. In an apparatus for producing a curved surface, a base, a head member mounted on the base, a face plate secured to said head member, a pair of guide members pivotally and adjustably mounted on said face plate, a slide member engaging each of said guide members, a pin pivotally connecting said slide members, a movable plate mounted on said pin, means to oscillate said movable plate, said movable plate including arcuate slots, a pin on each of said slide members, each of said last mentioned pins engaging in one of the arcuate slots in said movable plate, a tool mounted on said movable plate, said tool describing an arcuate path upon oscillation of said movable plate, the radius of said path being dependent upon the adjusted initial position of said last mentioned pins in said arcuate slots, a carriage plate slidably mounted on said base, a carriage slidably mounted on said carriage plate, a means to rotatably support a piece of work on said carriage, and means to rotate the work.

15. In an apparatus for producing a curved surface, a base, a tool, means to mount said tool on the base for oscillating movement, a carriage plate slidably mounted on said base, a face plate mounted on said base, a pair of guide members pivotally and adjustably mounted on said face plate, a slide member engaging each of said guide members, a pin pivotally connecting said slide members, said carriage plate being mounted on said pin, means to oscillate said carriage plate for intermittent or constant motion, a carriage slidably mounted on said carriage plate, means to support a piece of work on said carriage, means to rotate said work, said work upon oscillation of said carriage plate describing an arcuate path adjacent said tool, the radius of the path of the work being dependent upon the adjusted initial angle between the guide members and means to adjust the relative position of the work and the tool.

16. In an apparatus for producing a curved surface, a base, a head member mounted on the base, a face plate secured to said head member, a pair of guide members pivotally and adjustably mounted on said face plate, a slide member engaging each of said guide members, means pivotally connecting said slide members, a movable plate mounted on said pivotal means, means to oscillate said movable plate, said movable plate including arcuate slots, means on each of said slide members engaging in one of the arcuate slots in said movable plate, a tool mounted on said movable plate, a carriage plate movably mounted on said base, a second face plate mounted on said base, a pair of guide members pivotally mounted on said second face plate, a slide member engaging each of said guide members, means pivotally connecting said last mentioned slide members, said carriage plate being mounted on said last mentioned pin, means to oscillate said carriage plate, a carriage movably mounted on said carriage plate, and means to support a piece of work on said carriage, means to rotate said work, said work upon oscillation of said carriage plate describing an arcuate path adjacent said tool.

17. In an apparatus for producing an arcuate surface, a base, a head member mounted on said base, a face plate secured to said head member, a pair of guide members pivotally and adjustably mounted in said face plate, a slide member engaging each of said guide members, means pivotally connecting said slide members, a movable plate mounted on said pivot means, means to oscillate said movable plate, said movable plate including arcuate slots, a means on each of said slide members slidably engaging in one of the arcuate slots in said movable plate, a tool mounted on said movable plate, said tool describing an arcuate path upon oscillation of said movable plate, the radius of said path being dependent upon the adjusted initial angle between said guide members, a carriage plate slidably mounted on said base, a second face plate mounted on said base, a pair of guide members pivotally mounted on said second face plate, means to adjust the angle between said second mentioned guide members, a slide member engaging each of said last mentioned guide members, means pivotally connecting said last mentioned slide members, said carriage plate being mounted on said last mentioned pivot means, means to oscillate said carriage plate, a carriage slidably mounted on said carriage plate, means to support a piece of work on said carriage, and means to rotate said work, said work upon oscillation of said carriage plate describing an arcuate path adjacent said tool, the radius of the path of the work being dependent upon the adjusted initial angle between said second mentioned guide members.

18. In an apparatus for producing an arcuate surface, a base, a head member mounted on said base, a face plate secured to said head member, a pair of guide members pivotally and adjustably mounted on said face plate, a slide member engaging each of said guide members, a pin pivotally connecting said slide members, a movable plate mounted on said pin, means to oscillate said movable plate, said movable plate including arcuate slots, a pin on each of said slide members, each of said last mentioned pins slidably engaging in one of the arcuate slots in said movable plate, a tool mounted on said movable plate, said tool describing an arcuate path upon oscillation of said movable plate, the radius of said path being dependent upon the adjusted initial position of said last mentioned pins in said arcuate slots, a carriage plate slidably mounted on said base, a second face plate mounted on said base, a pair of guide members pivotally mounted on said second face plate, means to adjust the angle between said last mentioned guide members, a slide member engaging each of said last mentioned guide members, a pin pivotally connecting said last mentioned slide members, said carriage plate being mounted on said last mentioned pin, means to oscillate said carriage plate, a carriage slidably mounted on said carriage plate, means on said carriage to hold a piece of work, means to rotate said work, said work upon oscillation of said carriage plate describing an arcuate path adjacent said tool and in a plane perpendicular to the plane of movement of said tool, the radius of the path of the work being dependent upon the adjusted initial angle between said second mentioned guide members, and means to adjust the relative position of the work and said tool.

DONALD C. ASHMORE.
GROVE McCHESNEY.